(12) United States Patent
Hedges et al.

(10) Patent No.: US 9,895,856 B2
(45) Date of Patent: *Feb. 20, 2018

(54) STRUCTURAL MAT FOR REINFORCING A WIND TURBINE BLADE STRUCTURE, A WIND TURBINE BLADE AND A METHOD FOR MANUFACTURING A WIND TURBINE BLADE

(71) Applicant: Vestas Wind Systems A/S, Aarhus N (DK)

(72) Inventors: Andrew Hedges, Southhampton (GB); Tomas Vronsky, Southhampton (GB)

(73) Assignee: Vestas Wind Systems A/S, Aarhus N., (DK)

( * ) Notice: Subject to any disclaimer, the term of this patent is extended or adjusted under 35 U.S.C. 154(b) by 376 days.

This patent is subject to a terminal disclaimer.

(21) Appl. No.: 13/969,166

(22) Filed: Aug. 16, 2013

(65) Prior Publication Data

US 2013/0333823 A1 Dec. 19, 2013

Related U.S. Application Data

(63) Continuation of application No. 12/740,820, filed as application No. PCT/DK2008/000392 on Nov. 7, 2008, now Pat. No. 8,529,717.

(30) Foreign Application Priority Data

Nov. 9, 2007 (DK) .................................. 2007 01587

(51) Int. Cl.
*B32B 7/08* (2006.01)
*B29C 70/52* (2006.01)
(Continued)

(52) U.S. Cl.
CPC ........ *B29D 99/0025* (2013.01); *B29C 70/083* (2013.01); *B29C 70/342* (2013.01);
(Continued)

(58) Field of Classification Search
USPC ....... 156/60, 91, 92, 93, 148, 149, 166, 167, 156/176, 178, 180, 181, 182, 196, 212,
(Continued)

(56) References Cited

U.S. PATENT DOCUMENTS

| 6,355,584 B1 * | 3/2002 | Corrons ......................... 442/367 |
| 2004/0253114 A1 * | 12/2004 | Gunneskov et al. ......... 416/224 |

(Continued)

FOREIGN PATENT DOCUMENTS

| EP | 1145841 A1 * | 10/2001 | ............... B32B 5/12 |
| WO | WO 2005011964 A1 * | 2/2005 | ............. B29C 70/70 |
| WO | WO 2005071152 A1 * | 8/2005 | ............. D04H 13/00 |

*Primary Examiner* — Philip Tucker
*Assistant Examiner* — Brian R Slawski
(74) *Attorney, Agent, or Firm* — Wood Herron & Evans LLP (57) ABSTRACT

The invention relates to a structural mat for reinforcing a wind turbine blade structure. The structural mat comprises two or more groups of bonded fibers, the fibers being bonded by a matrix substantially preventing relative movement of said fibers and wherein said groups are connected to each other by connection means limiting the relative movement of said groups. The invention further relates to a wind turbine blade and a method for manufacturing a wind turbine blade.

17 Claims, 7 Drawing Sheets

(51) Int. Cl.
| | |
|---|---|
| B29C 65/00 | (2006.01) |
| C09J 5/00 | (2006.01) |
| B32B 37/00 | (2006.01) |
| B63H 1/26 | (2006.01) |
| B63H 7/02 | (2006.01) |
| B64C 11/16 | (2006.01) |
| B64C 27/46 | (2006.01) |
| F01D 5/14 | (2006.01) |
| F03B 7/00 | (2006.01) |
| F03D 11/02 | (2006.01) |
| F04D 29/38 | (2006.01) |
| B29D 99/00 | (2010.01) |
| B29C 70/08 | (2006.01) |
| B29C 70/34 | (2006.01) |
| B29C 70/44 | (2006.01) |
| B29C 70/54 | (2006.01) |
| D04H 3/002 | (2012.01) |
| D04H 3/004 | (2012.01) |
| D04H 3/115 | (2012.01) |
| D04H 3/12 | (2006.01) |
| B32B 5/06 | (2006.01) |
| B29C 65/62 | (2006.01) |
| B29C 70/86 | (2006.01) |
| B29L 31/08 | (2006.01) |

(52) U.S. Cl.
CPC .......... *B29C 70/443* (2013.01); *B29C 70/543* (2013.01); *B29D 99/0028* (2013.01); *D04H 3/002* (2013.01); *D04H 3/004* (2013.01); *D04H 3/115* (2013.01); *D04H 3/12* (2013.01); *B29C 65/62* (2013.01); *B29C 66/721* (2013.01); *B29C 70/52* (2013.01); *B29C 70/865* (2013.01); *B29L 2031/082* (2013.01); *B29L 2031/085* (2013.01); *B32B 5/06* (2013.01); *B32B 7/08* (2013.01); *Y02P 70/523* (2015.11)

(58) Field of Classification Search
USPC ......... 156/213, 242, 244.11, 244.22, 244.24, 156/244.25, 292, 296, 305; 416/223, 224, 416/226, 229 R, 230, 241 R, 241 A
See application file for complete search history.

(56) References Cited

U.S. PATENT DOCUMENTS

| | | | |
|---|---|---|---|
| 2006/0172636 A1* | 8/2006 | Bech | 442/1 |
| 2007/0140861 A1* | 6/2007 | Wobben | 416/230 |
| 2007/0193491 A1* | 8/2007 | Lilleheden et al. | 112/475.01 |
| 2011/0187115 A1* | 8/2011 | Piasecki | 290/55 |

* cited by examiner

STRUCTURAL MAT FOR REINFORCING A WIND TURBINE BLADE STRUCTURE, A WIND TURBINE BLADE AND A METHOD FOR MANUFACTURING A WIND TURBINE BLADE

CROSS REFERENCE TO RELATED APPLICATIONS

This application claims the benefit of U.S. patent application Ser. No. 12/740,820, filed Apr. 30, 2010, now U.S. Pat. No. 8,529,717, which is a U.S. National Phase Application of International Application No. PCT/DK08/00392, filed Nov. 7, 2008, which claimed the benefit of Denmark Patent Application No. PA 2007 01587, filed Nov. 9, 2007, the disclosures of which are incorporated by reference herein in their entirety.

TECHNICAL FIELD

The invention relates to a structural mat for reinforcing a wind turbine blade structure, a wind turbine blade and a method for manufacturing a wind turbine blade.

BACKGROUND

A wind turbine known in the art typically comprises a wind turbine tower and a wind turbine nacelle positioned on top of the tower. A wind turbine rotor, comprising three wind turbine blades, is connected to the nacelle through a low speed shaft, which extends out of the nacelle front as illustrated on FIG. 1.

In recent years the development of mass-produced wind turbines has moved towards making them larger and larger, both in output and in size. This process calls for better and more cost-efficient components and manufacturing methods, and particularly in the field of mass-produced wind turbine blades, this development has been profound, in that the average mass-produced wind turbine blade over the recent years has more than doubled its length.

Wind turbine blades known in the art are typically made of fibre-glass reinforced by metal, wood or carbon fibres. The blades are typically manufactured by moulding two blade halves in two independent moulds and when the blade halves are hardened the two are connected to form the wind turbine blade.

To ensure the aerodynamic properties of an operating wind turbine blade it is important that the blade is substantially rigid and substantially do not change shape e.g. when subject to a high wind load, centrifugal force, gravity or other.

However it is also important that the blade is a little flexible so that the blade can bend a little when subject to sudden wind gusts or other.

Fibres running in the longitudinal length of the blade is a very efficient way of providing the blade with the desired qualities regarding stiffness and flexure but for a fibre to be able to affect the blades rigidity noticeably, it first of all has to be rigidly connected to or integrated in the blade and second of all it has to run continuous and substantially straight (i.e. without creases and wrinkles) in the entire length of the fibre, especially if it has to extend substantially in the entire longitudinal length of the wind turbine blade.

However, a single fibre is so flexible that it would be virtually impossible to ensure no creases or wrinkles while the fibre is attached to the rest of the blade.

E.g. from US patent no. 2007/0140861 A1 it is therefore known to form a stiff board of longitudinal extending fibres and then places this specially adapted board in the blade shell to reinforce the blade.

However this board would have to be made with a low tolerance to fit the shell and it would only fit a specific blade type.

An object of the invention is therefore to provide for an advantageous technique for reinforcing a wind turbine blade.

SUMMARY

The invention provides for a structural mat for reinforcing a wind turbine blade structure. The structural mat comprises two or more groups of bonded fibres, the fibres being bonded by a matrix substantially preventing relative movement of said fibres and wherein said groups are connected to each other by connection means limiting the relative movement of said groups.

It is advantageous to form groups of the fibres by using a matrix, in that the position and direction of the individual fibre is hereby ensured.

But for the groups to be rigidly connected to the blades structure the size of the groups is limited by the fact that the blade infusion resin must be able to completely surround each group and also have enough flow to wet-out the standard blade fabrics (i.e. solid mats and the likes would be disadvantageous) and the cross sectional size of these groups are also limited by the fact that each group has to be able to adapt to the complex blade geometry and if more stiffness is needed that one group can provide—while still being flexible enough to adapt to the blade geometry—it is therefore advantageous to connected the groups to each other by connection means to simplify the blade manufacturing process and to make the groups fix each other and thereby further reduce the risk of the groups being displaced or wrinkling when the mat is being integrated in or connected to the blade, especially if this is done by resin in a infusion process.

Furthermore, it is advantageous that the groups are connected to each other by connection means, in that it ensures that the gaps between the groups are kept substantially at a desired size, hereby e.g. reducing the amount of resin needed to completely saturate the mat and thereby preventing excessive exothermic reactions from blade infusion resin.

It should be emphasised that by the term "mat" is to be understood, any kind of configuration comprising two or more neighbouring elements forming any kind of mat-like structure including any kinds of bands, strings, rugs, pads or any kind of similar structure.

It should also be emphasised that by the term "group" is to be understood, any kind of roving, bundle, bunch or collection of elements.

Furthermore it should be emphasised that by the term "fibre" is to be understood, any kind of filamentary or thread-like material including any kind of natural fibres, metal fibres or mineral fibres such as cellulose-based fibres, polymer fibres, glass, aramid or carbon fibres.

It should also be emphasised that in this context the term "matrix" is to be understood as the material in which the fibre reinforcements of the composite group are imbedded. For instance thermoplastic and thermoset resin systems, as well as metal and ceramic, can be used as matrix.

Even further, it should be emphasised that by the term "wind turbine blade structure" is to be understood, any part of, in or attached rigidly to the blade shell forming the outer contour of the blade including separate strengthening members in the form of blade web, a beam or a spar extending in the blade and forming a more or less integrated part of the entire blade structure.

In an aspect of the invention, said matrix is resin.

Resin is a strong and durable material making it very suitable for bonding fibres to form a group.

It should be emphasised that by the term "resin" is to be understood, any kind of natural or synthetic resins such as epoxy resin, thermosetting resin, unsaturated polyester resin, ion exchange resin, melamine resin and more. In short the term "resin" refers to any viscous liquids capable of hardening.

In an aspect of the invention, said bonded fibres in each group are substantially unidirectional.

The more parallel the fibres in each group are the more inflexible the group is in the longitudinal direction of the groups. Bonding the fibres in each group so that they are substantially unidirectional is therefore advantageous in that it provides for a strong and rigid group suitable for use in a mat for reinforcing a wind turbine blade.

In an aspect of the invention, said two or more groups are arranged substantially parallel in said mat.

Making the groups run substantially parallel in the mat is advantageous in that it increases the mats strength and rigidity in the longitudinal extend on the mat, which is advantageous when used for reinforcing wind turbine blades.

Furthermore a mat comprising unidirectional groups are simple to manufacture and therefore more inexpensive.

In an aspect of the invention, at least one of said groups are pre-cured or substantially pre-cured.

By pre-curing or substantially pre-curing the groups in the mat the stability and rigidity of the groups are increased hereby eliminating or reducing the risk of the groups creasing or wrinkling during the manufacturing of the blade.

Furthermore, pre-cured groups are much simpler to handle than sticky resin saturated bundles of fibres.

In an aspect of the invention, said structural mat is substantially dry.

A dry mat is not sticky or at risk of starting to cure unwanted or other. This is advantageous in that the handling, storing and implementing in the blade therefore becomes much simpler.

It should be emphasized that by the term "dry" is to be understood that the mat do not contain liquid or semi-liquid substances such as resin which has not been cured or the like—i.e. the mat is not pre-impregnated with un-cured resin.

In an aspect of the invention, said structural mat comprises two or more layers of said groups.

Making the mat comprise two or more layers of the groups of bonded fibres is advantageous in that it provides for a simple way of adjusting the thickness of the mat and hereby establishing the stiffness of the mat without changing the width of the mat or the shape of the groups.

In an aspect of the invention, the groups of one or more of said two or more layers is angled in relation to the groups of one or more further layers of said two or more layers.

Angling one layer of the mat so that the groups of the mat is not parallel with the groups of another layer of said mat is advantageous, in that it hereby is possible to form a mat which is strong in more directions. E.g. if one layer of the mat was arranged so that the groups or the majority of the groups runs substantially in the longitudinal direction of the blade, another layer of the mat could be arranged with the groups running transversely to the groups of the first layer i.e. angled 90° in relation to the first layer. This would increase the mats stiffness transversely and it could provide for a more stable and uniform mat.

In an aspect of the invention, said two or more layers of said groups are connected by layer connection means limiting the relative movement of said layers.

Connecting the layers with connection means such as stitching means, is advantageous in that it ensures a more uniform mat and in that the mat becomes simpler to handle.

In an aspect of the invention, said structural mat comprises a tapered end region.

Providing the mat with one or more tapered end regions is advantageous in that by making the thickness of the mat gradually decrease the stiffness also gradually decreases and potentially harmful stress concentrations is reduced or avoided.

In an aspect of the invention, said structural mat comprises a tapered side region.

Likewise, it is advantageous to provide the mat with one or more tapered side regions in that the mat thickness then gradually decreases, hereby reducing the risk of potentially harmful stress concentrations.

In an aspect of the invention, said fibres are carbon fibres and/or glass fibres.

Carbon fibres and glass fibres are characterized by being light weight and at the same time having a high strength and high stiffness. Furthermore these fibre types are relatively inexpensive making them ideal for reinforcing wind turbine blades.

In an aspect of the invention, one or more of said groups are formed with a cross-sectional shape comprising three or more different axes of symmetry.

The more different axes of symmetry a shape comprises the more uniform the size of deflection is no matter from which direction the group is strained. Regarding strains from different directions the circular shape would be ideal in that this shape comprises an infinite number of axes of symmetry but e.g. to reduce the free space between the groups and thereby reduce the amount of matrix needed to completely saturate the mat, it could be advantageous to provide the groups with a more angular shape such as square e.g. with rounded corners.

In an aspect of the invention, said groups comprises a cross-sectional area of between 1 and 100 $mm^2$, preferably between 3 and 40 $mm^2$ and most preferred between 6 and 25 $mm^2$.

If the cross sectional area of the groups becomes too large the groups could become too stiff making it difficult to make the mat adapt to the complex shape of a wind turbine blade. If the cross sectional area of the groups becomes too little the groups might become too flexible hereby increasing the risk of the groups creasing or wrinkling during the manufacturing of the blade and increasing the risk of breaking during manufacture.

The present area ranges therefore provides for an advantageous relation between adaptability and stiffness.

In an aspect of the invention, said groups are formed with a substantially uniform cross-sectional shape throughout the longitudinal extend of said groups.

If the groups are formed uniform in their entire length the groups are much simpler to manufacture and the properties of the groups are more predictable.

Furthermore, except for tapered end regions it is advantageous that each group is uniform in its entire length in the mat, in that it hereby is possible to use the mat for any wind turbine blade type and e.g. coil the pre-made mat onto a spool and then unwind and cut of the desired length of mat during manufacturing of the blade.

In an aspect of the invention, one or more said groups in said mat are formed with a substantially polygonal cross-sectional shape and wherein one or more sides of said group are convex.

Providing the groups with convex sides—i.e. the sides are bulging outwards—is advantageous in that if the sides are completely straight, the gap between neighbouring square groups could be 0 mm, hereby rendering it impossible for resin to pass during an infusion process. However, if the sides are convex there would always be some free space between neighbouring groups for resin to pass, no matter how hard the groups are pressed against each other.

In an aspect of the invention, said connection means is stitching means comprising one or more threads stitching said groups together.

Connecting the groups in a mat by stitching means is advantageous in that stitching is a simple and efficient method for connecting elongated elements such as groups of bonded fibres.

Furthermore, stitching means is advantageous in that these means enables the groups to displace longitudinally relative to each other (e.g. by up to 5 millimeters)—thereby allowing the mat to be formed into a curve or other.

In an aspect of the invention, said wind turbine blade structure, reinforced by said structural mat, is a load carrying structure of said blade, such as the blade structure along a trailing edge, a leading edge or a strengthening member of said blade.

Different parts of the blade are loaded differently and the areas along the trailing edge, the leading edge and along a strengthening member (i.e. the thickest part of the blade) usually comprises some kind of load carrying structure in large modern wind turbine blades, in that these areas are particularly strained when the blade is operating on a wind turbine. It is therefore advantageous to provide the load carrying structure of the blade with structural mats for reinforcing and stiffening the blade where it is needed the most.

In an aspect of the invention, said groups of bonded fibres has a stiffness EI between 0.01 and 420 $Nm^2$, preferably between 0.03 and 35 $Nm^2$ and most preferred between 0.15 and 1.6 $Nm^2$, where EI is the product of the elastic modulus E and the second moment of inertia I of the groups.

If the stiffness (the EI relationship) of the groups becomes too high the groups could become too stiff making it difficult to make the mat adapt to the complex shape of a wind turbine blade. If the module of elasticity of the groups becomes too little the groups might become too flexible hereby increasing the risk of the groups creasing or wrinkling during the manufacturing of the blade and the risk of the groups breaking is also increased.

The present stiffness ranges therefore provides for an advantageous relation between adaptability and usability.

Furthermore, the invention provides for a wind turbine blade comprising one or more structural mats according to any of the preceding claims.

Using a structural mat as described above in a wind turbine blade is advantageous in that the blade hereby becomes more rigid and strong without the weight of the blade being increased much.

Even further, the invention provides for a method for reinforcing a wind turbine blade structure. The method comprises the steps of forming at least a part of the blade structure by one or more layers of blade material, reinforcing the blade structure by adding one or more structural mats according to any of the above to the blade structure, optionally adding further blade material to the blade structure, infusing a resin into at least a part of the blade material and the structural mats and curing the infused resin to rigidly connect the structural mats to the blade material.

Hereby is achieved an advantageous embodiment of the invention e.g. in that when adding the structural mats according to the present invention to the blade structure during the shaping of the blade structure, the structural mats can be unified with or integrated in the blade structure very rigidly in that the resin will bind everything rigidly together.

Even further, the invention provides for a method for manufacturing a wind turbine blade. The method comprises the steps of:

initial preparation of one or more blade moulds, establishing one or more layers of outer structural blade material in the blade moulds, adding one or more structural mats according to any of the above in the blade moulds, optionally adding further structural blade material in the blade moulds, and performing final wind turbine blade manufacturing steps, including infusing a resin and curing the infused resin to make the structural mats form part of a load carrying structure of the blade.

Adding one or more structural mats to the blade mould before resin is infused is advantageous, in that the construction of the mat according to the invention reduces the risk of the mat and/or parts of the mat creasing or wrinkling during the infusion and in that by adding the mat before the infusion the mat is more rigidly integrated in the blade hereby increasing the effect of the mat.

It should be emphasized that wind turbine blades can be manufactured in a multitude of ways by usually initial preparation of the blade moulds comprises coating the moulds with a release coat for ensuring that the finished blade can be removed form the moulds and providing a layer of gel coat which ensure a smooth surface of the blade and other. Final wind turbine blade manufacturing steps could comprise bringing blade halves in contact with each other, connecting the blade halves by means of adhesive, applying pressure to at least parts of the blade halves during a curing process of the adhesive, removing the blade from the moulds and other.

BRIEF DESCRIPTION OF THE DRAWINGS

The invention will be described in the following with reference to the figures in which.

DETAILED DESCRIPTION

Figure 1:
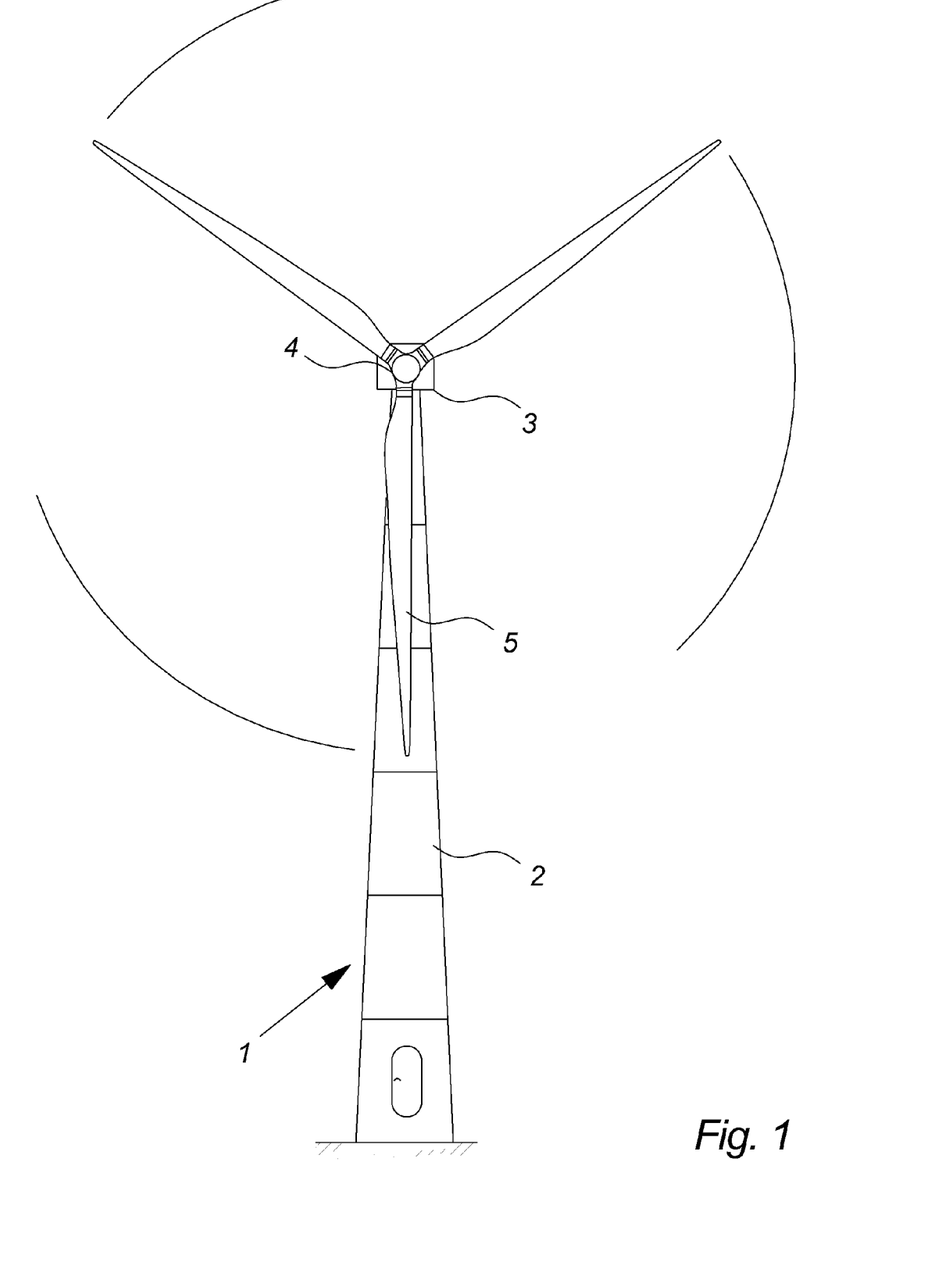
FIG. 1 illustrates a large modern wind turbine as known in the art.

FIG. 1 illustrates a large modern wind turbine as known in the art,

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figures 2, 3:
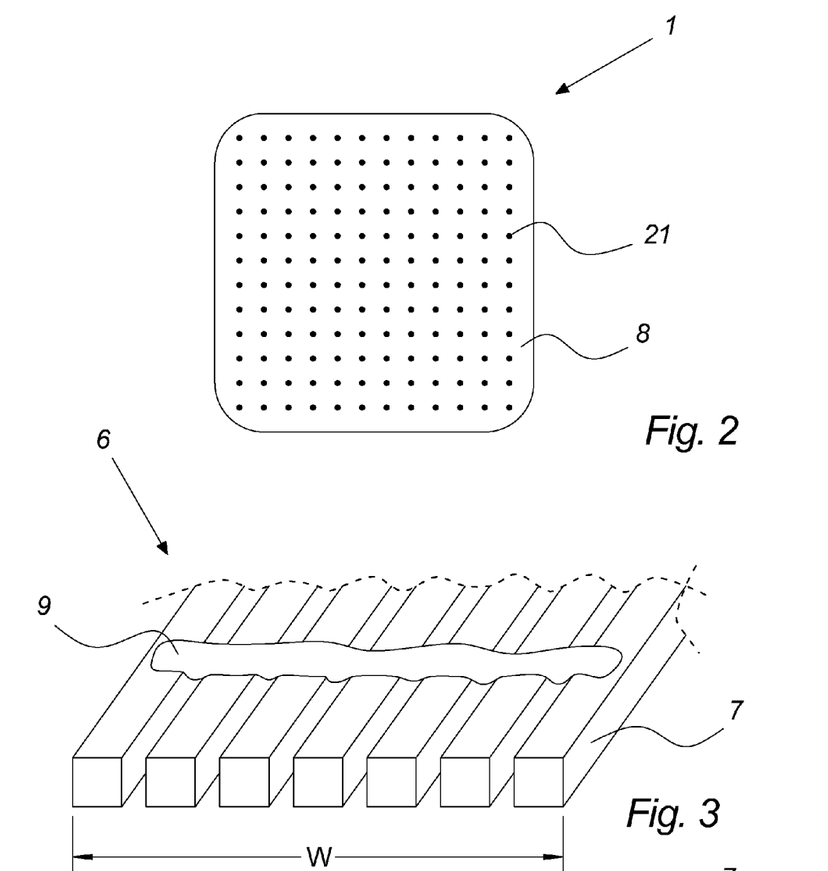
FIG. 2 illustrates a group of bonded fibres, as seen from the end.
FIG. 3 illustrates a structural mat comprising connection means, as seen in perspective.

FIG. 2 illustrates a group 7 of bonded fibres 21, as seen from the end.

In this embodiment of the invention the group 7 of bonded fibres 21 is formed as a substantially equilateral square with rounded corners but as explained later e.g. in relation with FIG. 9 an 10 the cross-section of the groups 7 can be shaped in a multitude of ways.

In this embodiment the group 7 comprises a number of evenly spaced fibres 21 fixed in the group 7 by a matrix 8 which in this embodiment is cured resin however, it is obvious to the skilled person that the fibres 21 could be arranged and distributed differently within the group 7.

In this simplified illustration of a group 7 the fibres 21 only constitutes a fraction of the total cross-sectional area of the group 7 but in a preferred embodiment of the invention the fibres 21 would constitute between 10% and 99%, preferably between 25% and 90% and most preferred between 45% and 85% of the total cross-sectional area of the group 7. Most often the fibres 21 would constitute at least 50% of the cross section area of the group.

In this embodiment the sides of the group 7 are straight but in another embodiment the sides might be slightly curved e.g. to allow for a more easy penetration of infusion resin.

The group 7 could be made in a number of ways but in a preferred embodiment the group 7 is made by pultrusion.

Pultrusion is a manufacturing process for producing continuous lengths of Fibre Reinforced Polymer (FRP) structural shapes. Raw materials could include a matrix 21 in the form of a liquid resin mixture (e.g. containing resin, fillers and specialized additives) and reinforcing fibres 21. The process involves pulling these raw materials (rather than pushing as is the case in extrusion) through a heated steel forming die using a continuous pulling device. The reinforcement materials are in continuous forms such as rolls of fibreglass tape or doffs of fibreglass roving. As the reinforcements are saturated with the resin mixture in a resin impregnator and pulled through the die, the curing (or hardening) of the resin is initiated by the heat from the die and a more rigid, cured group 7 is formed that substantially corresponds to the shape of the die.

In this embodiment the fibres 21 are glass fibres 21 but in another embodiment the fibres 21 could be any other kind of natural, mineral, metal or other fibre 21 suitable for reinforcing groups 7 according to the invention.

Likewise, the matrix 8 bonding the fibres 21 in the group 7 is in this embodiment a synthetic thermoset resin but in another embodiment the matrix 8 could be any kind of natural and/or synthetic resin suitable for bonding the fibres 21 in the group 7.

In this embodiment the group 7 has a height and width of approximately 4 millimeters but in another embodiment of the invention the groups 7 could have a height and width of between 0.1 and 20 mm, preferably between 0.2 and 12 mm and most preferred between 0.5 and 8 mm.

FIG. 3 illustrates a structural mat 6 comprising connection means 9, as seen in perspective.

In this embodiment of the invention the structural mat 6 comprise seven evenly spaced, aligned and neighboring groups 7 of bonded fibres 21 held together by connection means 9 in the form of a transverse string of rubber or rubber-like material connected to all the groups 7.

In this embodiment the mat 6 has a transverse width W of approximately 40 millimeters but in another embodiment the mat 6 could be between 1 and 5000 mm, preferably between 10 and 1000 mm and most preferred between 50 and 500 mm wide.

If the mat 6 is made too wide it might be difficult to fit in the blade 5 and if it is too narrow the manufacturing process might be more complicated if more parallel lengths of mats had to be laid out in the blade 5 to offer sufficient reinforcement.

In another embodiment the structural mat 6 could also be made with varying width W or thickness throughout its entire length e.g. to adapt the mat 6 specifically to the specific contours of a specific blade type.

In this embodiment the gap between the groups 7 is approximately 0.5 millimeters but in a preferred embodiment the gap would only be around 0.1 mm which just would be enough to allow for resin to pass in between the groups 7 during an infusing process when the mat 6 is placed in a blade mould 26, 27 when the blade 5 is being manufactured. It is advantageous if the gap is maintained at e.g. 0.1 mm throughout the entire longitudinal extent of the mat 6 in that if the gap is much smaller the risk of locking off resin during the infusion process is increased and if the gap is too large resin consumption would increase.

The connection means 9 should preferably substantially maintain the mutual transverse position of the groups 7 so that the gap is maximum 0.5 mm but at the same time allow for a little mutual displacement in the longitudinal direction of the groups 7 between 1 and 5 millimeters preferably around 2.5 millimeters to ensure that the mat 6 is flexible enough to follow the complex contour of the blade 5.

Figure 4:
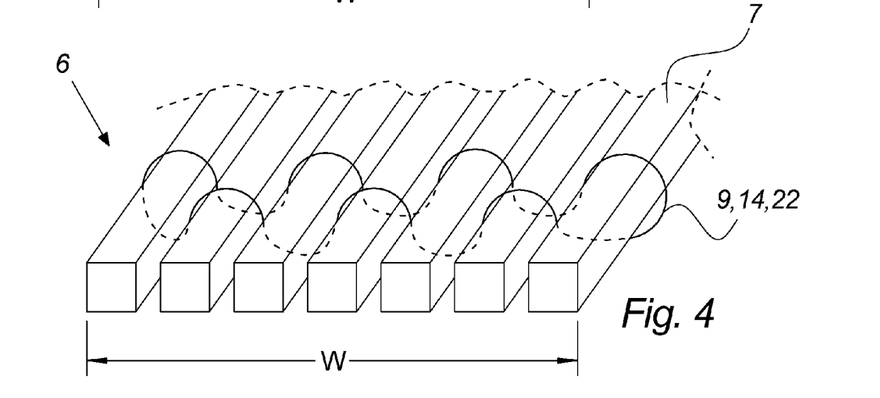
FIG. 4 illustrates a structural mat comprising stitching means, as seen in perspective.

FIG. 4 illustrates a structural mat 6 comprising stitching means 14, as seen in perspective.

In this embodiment of the invention the connection means 9 is stitching means 14 in the form of a thread 22 zig-zagging in and out between the groups 7 to stitch the groups together.

The stitching means 14 could in another embodiment also be one or more threads 22 tying e.g. two of the groups together and other threads 22 would then tie one of said two groups 7 to a neighboring group 7, which then by other threads 22 would be tied to the next neighboring group and so on.

The thread 22 used for stitching the groups 7 together are in this embodiment a string of polyester but in another embodiment the threads 22 could be made from any kind of natural or synthetic material such as nylon, roving of natural or synthetic fibres or any combination thereof.

In this embodiment connection means 9 are connecting the groups 7 for every 100 mm of the mat 6 in the longitudinal direction of the groups 7 but in another embodiment the connection means 9 could be placed closer or further apart e.g. depending on the module of elasticity of the groups 7, the cross sectional area of the groups 7, the complexity of the surface in the blade 5 which the mat 6 has to adapt to or any combination thereof.

Figure 5:
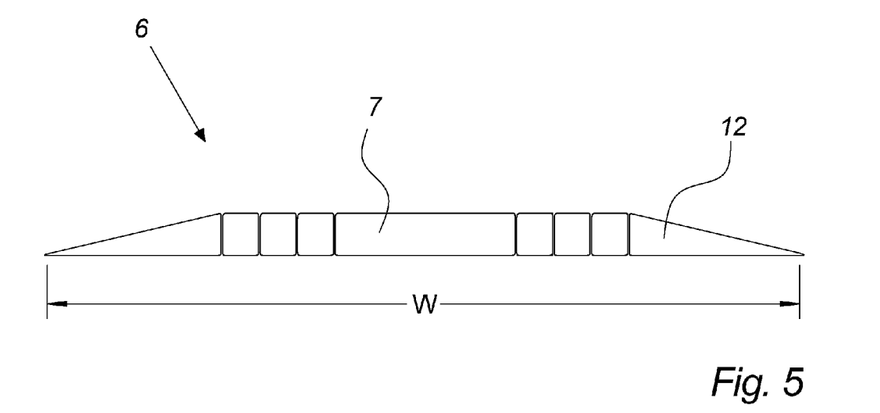
FIG. 5 illustrates a structural mat comprising tapered side regions, as seen from the end of the mat.

FIG. 5 illustrates a structural mat 6 comprising tapered side regions 12, as seen from the end of the mat 6.

The groups 7 of the mats 6 illustrated in FIGS. 3 and 4 have all been substantially identical i.e. they have substantially the same cross sectional shape and the same length but in this embodiment of the invention both the length and the cross sectional shape of the groups 7 vary throughout the mat 6.

To avoid or reduce local stress concentrations along the sides of the mat 6 and e.g. to ensure a gradual change of the stiffness in the blade 5, the structural mat 6 is in this embodiment provided with tapered side regions 12 in the form of triangular sideward pointing groups 7 placed outermost at both sides of the mat 6.

In another embodiment the mat 6 could only comprise tapered side regions 12 at one side of the mat 6 or only parts of the longitudinal extend of the mat 6 could be provided with one or two tapered side regions 12.

In this embodiment the mat 6 is also provided with a particularly wide group 7 at the centre. The wide group 7 only extends for a certain length of the longitudinal extend of the mat 6 to ensure high stiffness of the mat 6 at certain parts and e.g. reduce use of material or to ensure transverse flexibility of the mat 6 where the wide group 7 is not present.

Figure 6:
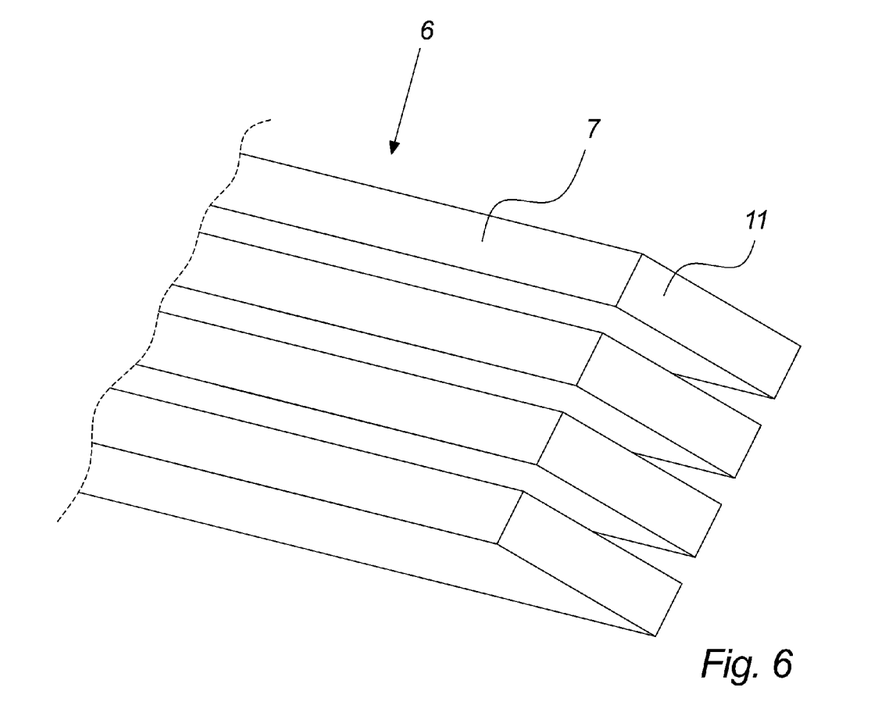
FIG. 6 illustrates a structural mat comprising a tapered end region, as seen in perspective.

FIG. 6 illustrates a structural mat 6 comprising a tapered end region 11, as seen in perspective.

Likewise, to avoid or reduce local stress concentrations at the end of the mat 6 and e.g. to ensure a gradual change of the stiffness in the blade 5 the structural mat 6 is in this embodiment provided with a tapered end regions 11 in that the height of the groups gradually decreases.

In this embodiment the groups 7 are of uniform length but in another embodiment the groups 7 could be of varying length e.g. making the end of the mat 6 pointy at the centre or at the sides e.g. to adapt to the narrowing shape of the wind turbine blade 5.

Figure 7:
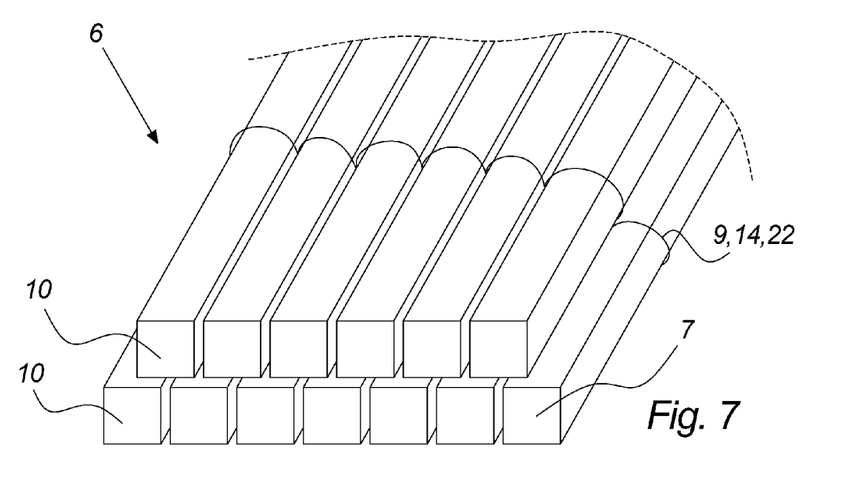
FIG. 7 illustrates a structural mat comprising more than one layer of groups, as seen in perspective.

FIG. 7 illustrates a structural mat 6 comprising more than one layer 10 of groups 7, as seen in perspective.

In this embodiment the mat 6 comprises two substantially uniform layers 10 but in another embodiment the mat 6 could comprise three, four, five or more layers 10 and each layer 10 could be formed differently from the next.

In this embodiment the layers 10 are connected by the same connection means 9 connecting the groups in the individual layers 10 in that the stitching means 14 connects the groups 7 next to and above or below each group 7 to said group 7.

In another embodiment the layers 10 could be connected by separate connection means 9 such as separate stitching means 14, separate clamps, strategically placed dots of glue or other.

In this embodiment of the invention all the groups 7 in all the layers 10 run substantially parallel but another embodiment of the invention one or more layers 10 could be placed in an angle in relation to one or more further layers 10 of the mat 6. For example one or more layers 10 could be placed in an angle of between 0° and 90° in relation to one or more other layers 10 to give desired blade stiffness properties in specific directions.

Figure 8:
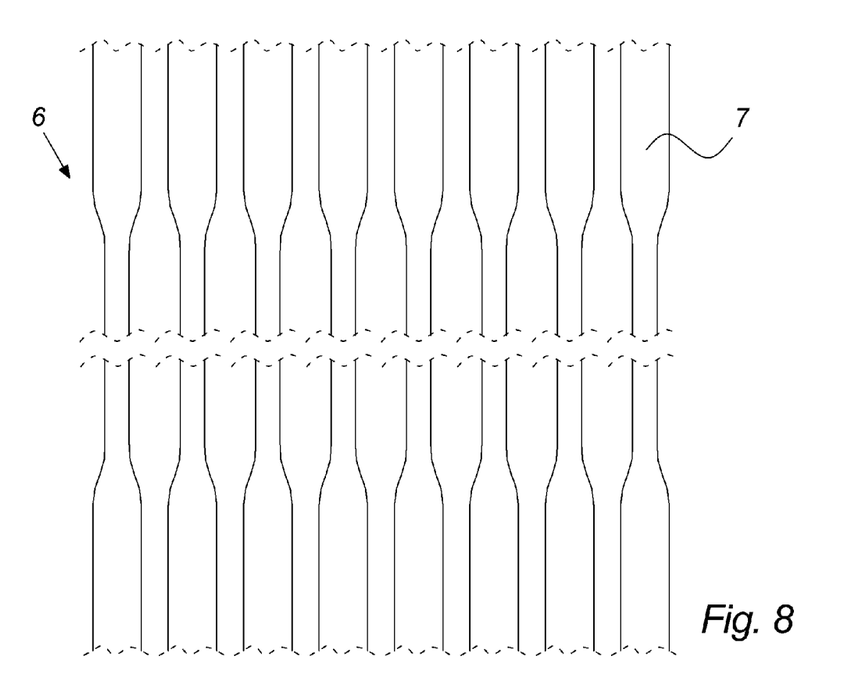
FIG. 8 illustrates a structural mat comprising groups of varying cross-section, as seen from the top.

FIG. 8 illustrates a structural mat 6 comprising groups 7 of varying cross-section, as seen from the top.

In this embodiment the cross sectional shape of all the groups 7 of a mat 6 diverge over the same longitudinal extend of the mat 6 e.g. to save material, to increase the transverse flexibility of the mat 6 to better adapt to a sharp turn in the blade 5 and/or to change blade stiffness as required along the blade 5.

In another embodiment the cross sectional area of the groups 7 could change also or instead, only some of the groups 7 could have varying cross sectional area and/or shape or the area and/or the shape could vary over different lengths.

Figure 9:
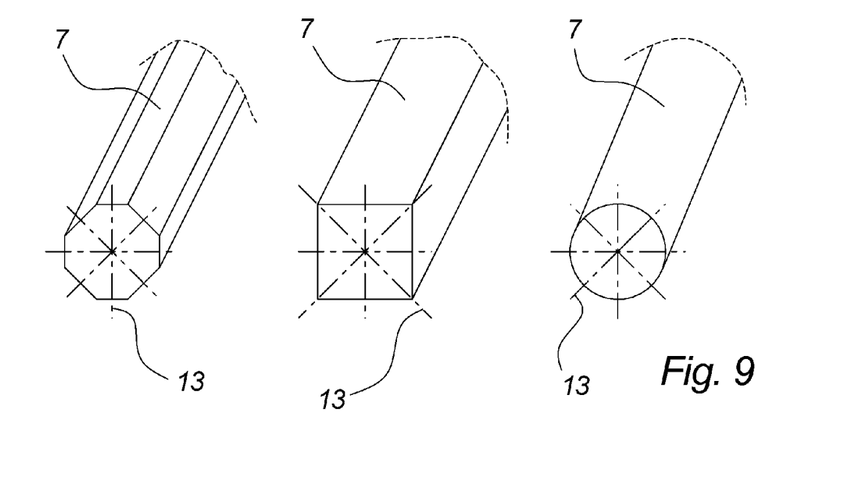
FIG. 9 illustrates different embodiments of groups with a shape comprising more than three different axes of symmetry, as seen in perspective.
Figure 10:
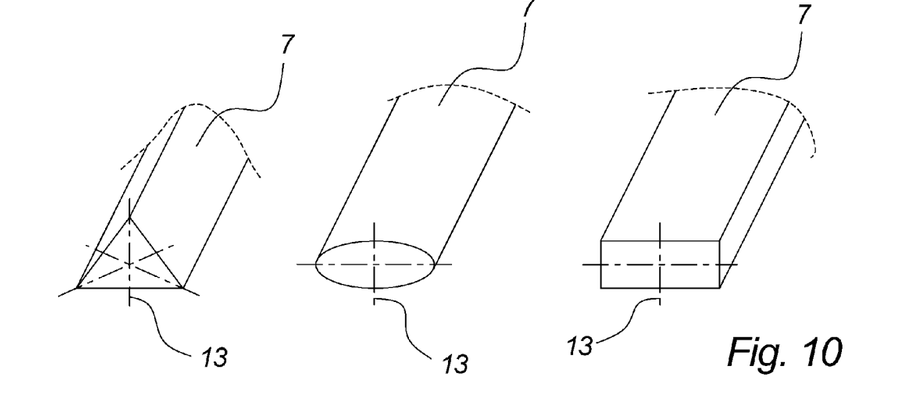
FIG. 10 illustrates different embodiments of groups with a shape comprising three or less different axes of symmetry, as seen in perspective.

FIG. 9 illustrates different embodiments of groups 7 with a shape comprising more than three different axes of symmetry 13, as seen in perspective.

Circular groups 7, square groups 7 and polygonal groups with at number of sides larger than four all comprise more than three different axes of symmetry 13 ensuring that the bending qualities are substantially uniform no matter if the mat 6 is strained up and down or sideways.

In this embodiment the height and the width (or the diameter) of the groups 7 are five millimeters and the stiffness EI of the groups is 1.6 Nm$^2$, making a 300 mm long cantilevered group 7 deflect 6 millimeters when subject to a load of 100 grams at the free end of the group 7.

However within a certain range the height, the width and the stiffness can be varied infinitely and in the below table this range is defined—where the stiffness EI is the product of the elastic modulus E and the second moment of inertia I of the groups 7.

The deflection column provides examples of deflections when straining the group 7 with a 100 grams mass at the end of the group 7.

|  | Group Length m | Group Width m | Group Thickness m | Stiffness EI Nm$^2$ | Deflection m |
|---|---|---|---|---|---|
| Most preferred range | 0.3 | 0.0028 | 0.0028 | 0.15 | 0.057 |
|  | 0.3 | 0.005 | 0.005 | 1.6 | 0.006 |
| More preferred range | 0.3 | 0.0014 | 0.0014 | 0.03 | 0.919 |
|  | 0.3 | 0.008 | 0.008 | 35 | 0.0003 |
| Preferred range | 0.3 | 0.0014 | 0.0014 | 0.01 | 0.276 |
|  | 0.3 | 0.015 | 0.015 | 420 | 0.0000 |

In this embodiment the groups 7 are all illustrated with sharp edges but in another embodiment the edges would be rounded and/or the sides might be slightly convex i.e. be slightly curved outwards e.g. to allow for a more easy penetration of infusion resin.

FIG. 10 illustrates different embodiments of groups 7 with a shape comprising three or less different axes of symmetry 13, as seen in perspective.

It is feasible that different bending qualities could be needed for bending in different directions and for this purpose the illustrated triangular, oval and rectangular groups 7 could be advantageous, in that these groups 7 all comprises three or less different axes of symmetry 13.

Figure 11:
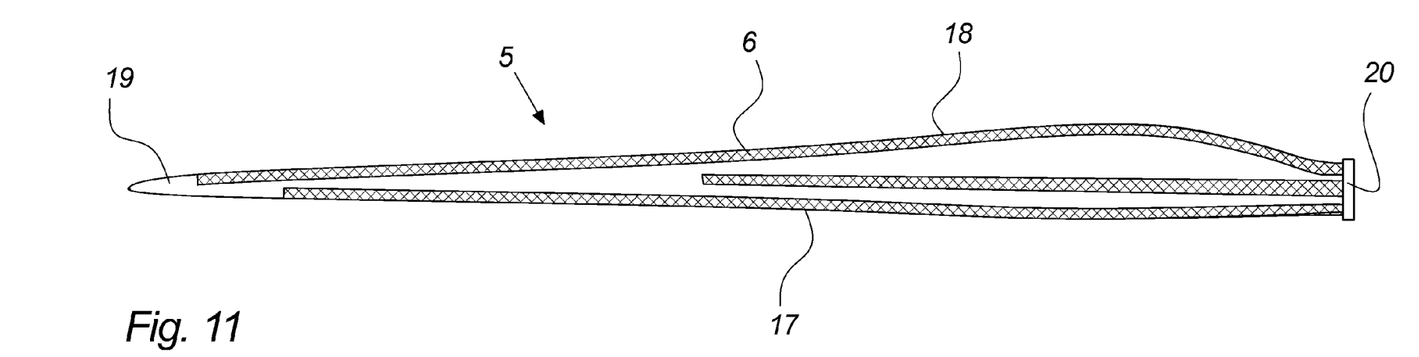
FIG. 11 illustrates a wind turbine blade comprising structural mats, as seen from the top.

FIG. 11 illustrates a wind turbine blade 5 comprising structural mats 6, as seen from the top.

In this embodiment of the invention the illustrate wind turbine blade 5 comprises a leading edge 17, a trailing edge 18, a tip 19 and a root 20.

The blade is typically hollow, except for one or more strengthening members 16 extending substantially the entire length of the blade 5 or part of the blades 5 length. A wind turbine blade 5 known in the art is typically made of a glass fibre and resin composite reinforced by carbon fibre, carbon fibre reinforced wood or a combination hereof.

In this embodiment of the invention the blade 5 is provided with structural mats 6 substantially along the entire length of the load carrying structure along the trailing edge 18, the leading edge 17 and the strengthening member 16 but in another embodiment the mats could only be placed along one of the load carrying structures of the blade 5 or along parts of one or more of the load carrying structures.

Figure 12:
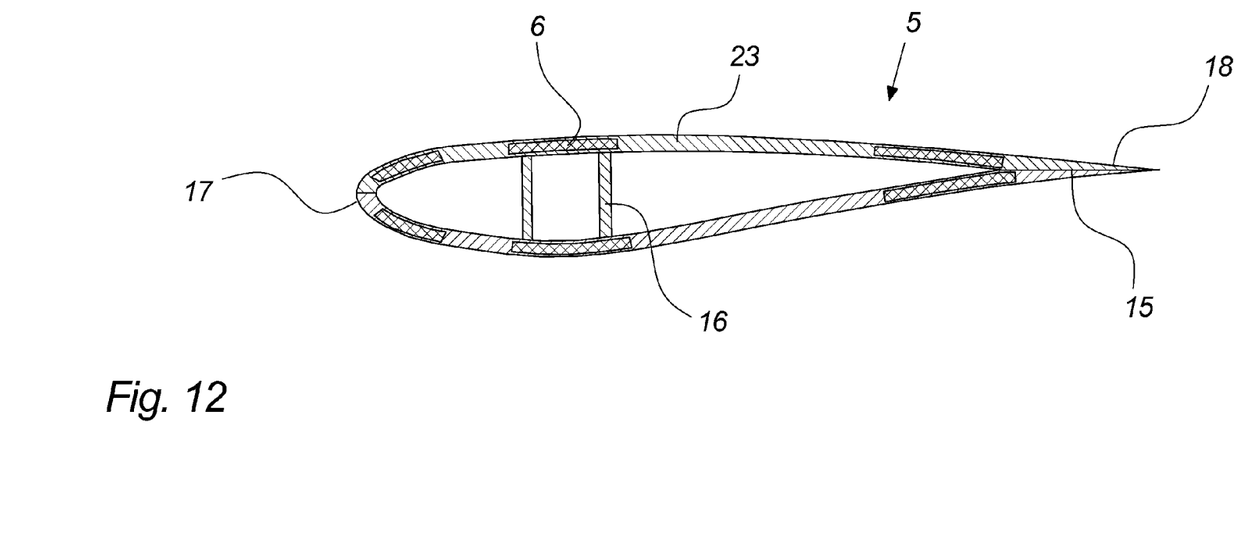
FIG. 12 illustrates a cross-section of a wind turbine blade comprising structural mats, as seen from the root of the blade.

FIG. 12 illustrates a cross-section of a wind turbine blade 5 comprising structural mats 6, as seen from the root 20 of the blade 5.

A wind turbine blade 5 known in the art is typically made of different kinds of material 23 in different kinds of layers usually interconnected by resin. In this embodiment the structural mats 6 are incorporated into and/or in between the other layers of blade material 23 but in another embodiment the mats 6 could be placed on top of the other blade material 23.

In this embodiment the thickness of the shell of the blade 5, comprising the blade material 23 and the structural mats 6, is substantially uniform in the entire width of the blade 5 but in a preferred embodiment the thickness would vary and particularly around the load carrying structure where structural mats 6 are placed the blade shell could be thicker than other parts of the blade shell.

In this embodiment of the invention mats 6 are arranged in the load carrying structure along the trailing edge 18, the leading edge 17 and the strengthening members 16 in both halves 24, 25 of the blade 5 but in another embodiment the mats 6 could only be placed in one of the blade halves 24, 25 or the mats 6 could be placed more asymmetrically in the blade halves 24, 25.

Figure 13:
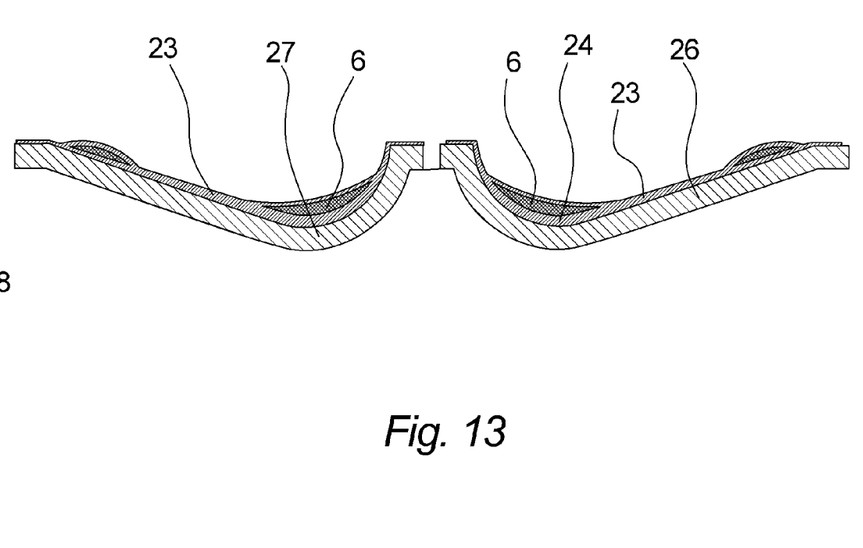
FIG. 13 illustrates a cross section of a first blade mould and a second blade mould placed beside each other, as seen from the root of the blade.

FIG. 13 illustrates a cross section of a first blade mould 26 and a second blade mould 27 placed beside each other, as seen from the root 20 of the blade 5.

In this embodiment a first blade half 24 is being moulded in a first blade mould 26 and a second blade half 25 is being moulded in a second blade mould 27.

Many different wind turbine blades 5 are known in the art and there are therefore also many different ways of manufacturing wind turbine blades 5 but one method for making wind turbine blades 5 includes preparing the moulds 26, 27 e.g. by coating the moulds 26, 27 with a release coat for ensuring that the finished blade 5 can be removed form the moulds 26, 27, providing a layer of gel coat which ensure a smooth surface of the blade 5 and other. Hereafter the actual blade structure is build by adding one or more layers of blade material 23 to the moulds 26, 27, where the blade material could be nonwoven or woven, dry or pre-impregnated fiberglass mats.

According to the invention the moulds 26, 27 could hereafter be added one or more strategically placed structural mats 6 comprising two or more connected groups 7 of bonded fibres 21, which will reinforce and stiffen the blade 5.

Hereafter the moulds 26, 27 could be provided with additional layers of blade material 23 to encapsulate the structural mats 6 in the blade material 23.

Resin could now be infused to rigidly connect the structural mats 6, the blade material 23 and e.g. other parts of the blade halves 24, 25 to form a single blade half 24, 25.

During the manufacturing process the blade 5 could also be provides with other kinds of blade material 23 and reinforcements e.g. made of wood, concrete, metal, polystyrene foam or other and further wind turbine blade manufacturing steps could be performed.

In this embodiment of the invention the moulds 26, 27 are for moulding an entire wind turbine blade 5, but since wind turbines 1 are getting larger and larger, the wind turbine blades 5 could be too long to be transported in one piece. The blade 5 would then be manufactured as sections, which then are to be assembled at the wind turbine mounting site.

Figure 14:
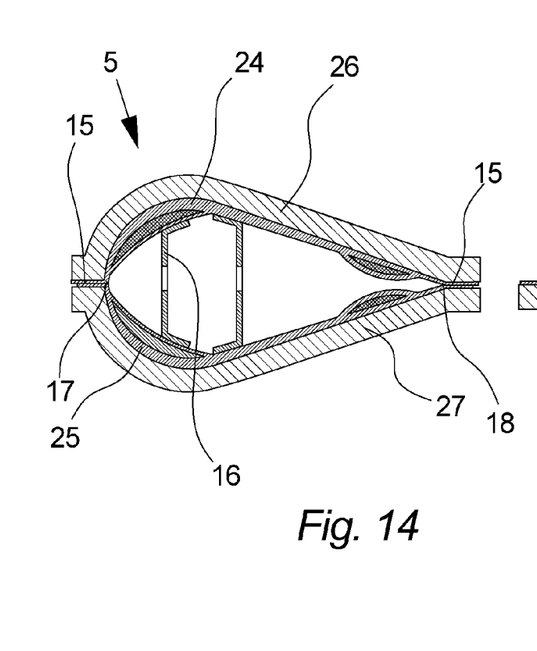
FIG. 14 illustrates a cross section of a closed wind turbine blade mould, as seen from the root of the blade.

FIG. 14 illustrates a cross section of a closed wind turbine blade mould 26, 27, as seen from the root 20 of the blade 5.

When the blade halves 24, 25 have hardened, two strengthening members 16 can be attached to the first blade half 24 e.g. by means of adhesive before the joint area 15 of the blade halves 24, 25 are provided with an adhesive, and the first blade half 24 including the first blade mould 26 is placed on top of the second blade half 25 and mould 27.

When the second blade half 25 is placed on top of the first 24, and the strengthening members 16 are attached to the second blade half 25, the strengthening members 16 constitutes cross braces making the blade 5 more rigid and helping the blade 5 maintain its shape.

In another embodiment the blade 5 could be provided with more or less than two juxtaposed strengthening members 16 e.g. one, three, four or six members or the wind turbine blade halves 24, 25 could be made so strong that no strengthening members 16 was needed.

After the blade halves 24, 25 have been brought together pressure is applied while the adhesive in the joint areas 15 hardens, where after the blade 5 is removed from the moulds 26, 27 and final touches are made such as removing excess material along the blade joints areas 15, polishing the blade 5 and other.

The invention has been exemplified above with reference to specific examples of wind turbine blades 5, groups 7, structural mats 6, wind turbine blade manufacturing methods and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Structural mat
7. Group of bonded fibres
8. Matrix
9. Connection means
10. Layer of groups
11. Tapered end region
12. Tapered side region
13. Axis of symmetry
14. Stitching means
15. Joint area of blade halves
16. Strengthening member
17. Leading edge
18. Trailing edge 19. Tip edge
20. Root
21. Fibre
22. Thread
23. Blade material
24. First blade half
25. Second blade half
26. First blade mould
27. Second blade mould
W. Width of mat

What is claimed is:

1. A method for reinforcing a wind turbine blade structure, comprising:
    forming at least a part of the blade structure by one or more layers of blade material;
    reinforcing the blade structure by adding one or more structural mats to the blade structure wherein the structural mats comprise two or more groups of bonded fibres, the fibres being bonded by a matrix substantially preventing relative movement of the fibres, and wherein the groups are connected to each other by a connector limiting the relative movement of the groups and wherein the structural mats are substantially dry;
    optionally adding further blade material to the blade structure;
    infusing a resin into at least a part of the blade material and the structural mats; and
    curing the infused resin to rigidly connect the structural mats to the blade material,
    wherein the structural mat comprises two or more layers of the groups.

2. The method according to claim 1, wherein the matrix is resin.

3. The method according to claim 1, wherein the bonded fibres in each group are substantially unidirectional.

4. The method according to claim 1, wherein the two or more groups are arranged substantially parallel in the mat.

5. The method according to claim 1, wherein at least one of the groups is pre-cured.

6. The method according to claim 1, wherein the groups of one or more of the two or more layers are angled in relation to the groups of one or more further layers of the two or more layers.

7. The method according to claim 1, wherein the two or more layers of the groups are connected by a layer connector limiting the relative movement of the layers.

8. The method according to claim 1, wherein the structural mat comprises a tapered end region at a longitudinal end of the structural mat, the structural mat decreasing in thickness in the direction of a thickness of the blade structure at the tapered end region.

9. The method according to claim 1, wherein the structural mat comprises a tapered side region.

10. The method according to claim 1, wherein the fibres are carbon fibres.

11. The method according to claim 1, wherein one or more of the groups is formed with a cross-sectional shape comprising three or more different axes of symmetry.

12. The method according to claim 1, wherein the groups are formed with a substantially uniform cross-sectional shape throughout the longitudinal extent of the groups.

13. The method according to claim 1, wherein one or more of the groups in the mat is formed with a substantially polygonal cross-sectional shape and wherein one or more sides of the group is convex.

14. The method according to claim 1, wherein the connector is stitching comprising one or more threads stitching the groups together.

15. The method according to claim 1, wherein the wind turbine blade structure, reinforced by the structural mat, is a load carrying structure of the blade.

16. The method of claim 1, wherein the groups of bonded fibres have a stiffness EI between 0.15 and 1.6, where EI is the product of the elastic modulus E and the second moment of inertia I of the groups.

17. A method for reinforcing a wind turbine blade structure, comprising:
    forming at least a part of the blade structure by one or more layers of blade material;
    reinforcing the blade structure by adding one or more structural mats to the blade structure wherein the structural mats comprise two or more groups of bonded fibres, the fibres being bonded by a matrix substantially preventing relative movement of the fibres, and wherein the groups are connected to each other by a connector limiting the relative movement of the groups and wherein the structural mats are substantially dry;
    optionally adding further blade material to the blade structure;
    infusing a resin into at least a part of the blade material and the structural mats; and
    curing the infused resin to rigidly connect the structural mats to the blade material,
    wherein the groups comprise a cross-sectional area of between 6 and 25 mm$^2$.

* * * * *